US008120216B2

(12) United States Patent
Sakata

(10) Patent No.: US 8,120,216 B2
(45) Date of Patent: Feb. 21, 2012

(54) ELECTRIC MOTOR AND ELECTRIC PUMP UNIT WITH BUSBARS INTEGRALLY FORMED WITH DRIVING CIRCUIT CONNECTING TERMINALS

(75) Inventor: Takatoshi Sakata, Yamatotakada (JP)

(73) Assignee: JTEKT Corporation, Osaka-Shi, Osaka (JP)

( * ) Notice: Subject to any disclaimer, the term of this patent is extended or adjusted under 35 U.S.C. 154(b) by 165 days.

(21) Appl. No.: 12/071,870

(22) Filed: Feb. 27, 2008

(65) Prior Publication Data

US 2008/0219867 A1    Sep. 11, 2008

(30) Foreign Application Priority Data

Feb. 28, 2007 (JP) ................. 2007-049858

(51) Int. Cl.
*H02K 3/38* (2006.01)
*H02K 3/32* (2006.01)

(52) U.S. Cl. ......... 310/71; 310/66; 310/67 R; 310/68 R; 310/216.115

(58) Field of Classification Search ............ 310/71, 310/67 R, 68 R, 216.115, 66; H02K 3/32, H02K 3/38
See application file for complete search history.

(56) References Cited

U.S. PATENT DOCUMENTS

| | | | | |
|---|---|---|---|---|
| 5,739,603 | A * | 4/1998 | Darceot | 310/71 |
| 6,737,772 | B2 * | 5/2004 | Tanaka et al. | 310/71 |
| 6,975,052 | B2 * | 12/2005 | Uchida et al. | 310/71 |
| 7,042,122 | B1 * | 5/2006 | Dufala et al. | 310/71 |
| 7,095,150 | B2 * | 8/2006 | Norell et al. | 310/71 |
| 7,116,023 | B2 * | 10/2006 | Wang et al. | 310/71 |
| 2005/0001494 | A1 | 1/2005 | Kuribayashi et al. | |
| 2005/0253466 | A1 * | 11/2005 | Seguchi et al. | 310/71 |
| 2008/0175732 | A1 | 7/2008 | Sakata | |

FOREIGN PATENT DOCUMENTS

| | | |
|---|---|---|
| EP | 1748534 A2 | 1/2007 |
| EP | 1947754 A1 | 7/2008 |
| EP | 2081279 A1 | 7/2009 |
| FR | 2857170 A | 1/2005 |
| JP | 7-39099 | 2/1995 |
| JP | 7-284239 | 10/1995 |
| JP | 2002-153003 A | 5/2002 |
| JP | 2005-27413 | 1/2005 |
| JP | 2005-287240 | 10/2005 |
| JP | 2005-341640 | 12/2005 |
| JP | 2006-262611 | 9/2006 |
| WO | WO 03/081755 A1 | 10/2003 |

OTHER PUBLICATIONS

"Separate." Dictionary.com Unabridged. Random House, Inc. Dec. 8, 2010. <Dictionary.com http://dictionary.reference.com/browse/separate>.*
European Search Report dated Dec. 4, 2009.

* cited by examiner

*Primary Examiner* — Quyen Leung
*Assistant Examiner* — Michael Andrews
(74) *Attorney, Agent, or Firm* — McGinn IP Law Group, PLLC

(57) ABSTRACT

The invention provides an electric motor including a tubular insulator that insulates coils of each of U, V, and W phases that makes a rotor rotated by an electromagnetic force, and a stator core around which the coils are wound; and a plurality of busbars that are fixed to the insulator to relay feed of power to the coils that constitute each phase. Ring-shaped terminals directly connected to an external driving circuit board for controlling a driving current leading to each phase of the coils, without via separate connecting members, are integrally formed in the busbars, respectively.

17 Claims, 4 Drawing Sheets

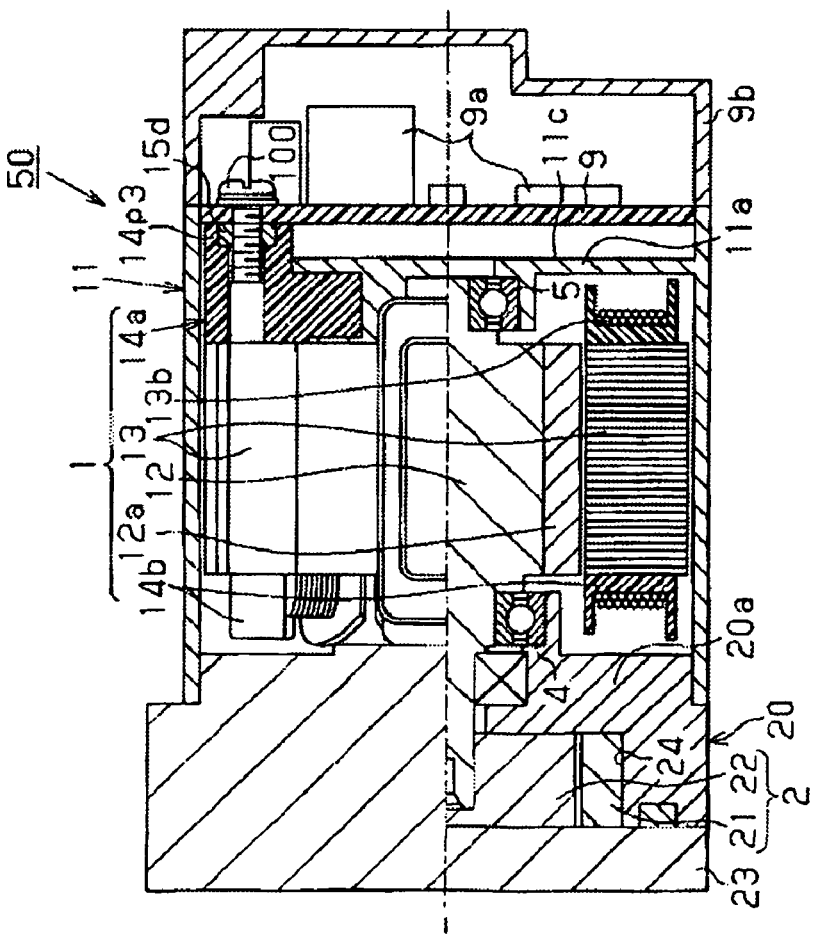
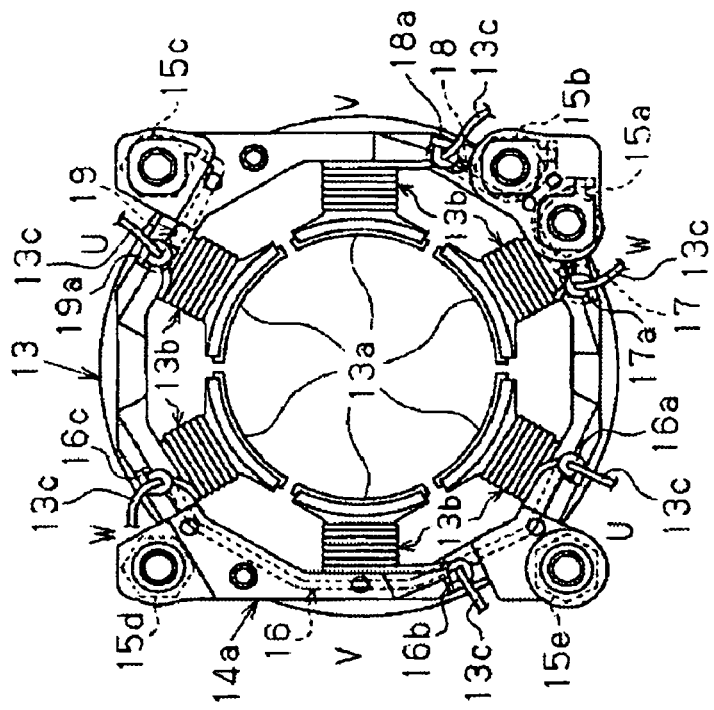

ELECTRIC MOTOR AND ELECTRIC PUMP UNIT WITH BUSBARS INTEGRALLY FORMED WITH DRIVING CIRCUIT CONNECTING TERMINALS

BACKGROUND OF THE INVENTION

The present invention relates to an electric motor including busbars serving as relay members that relay electrical connection between a driving circuit for controlling a driving current that leads to coils that make a rotor rotated by an electromagnetic force, and the coils, and further relates to an electric pump unit including the electric motor.

As an electric motor that has busbars used as relay members that relay electrical connection with an external driving circuit, etc., an electric motor described in, for example, JP-A-2005-27413 is known. This electric motor includes three-phase circuit lead wires (busbars) electrically connected to three coils that surround a rotor and constitute U, V, and W phases, respectively. The three-phase circuit lead wires are fixedly welded to internal terminals, are electrically connected to three harness slots provided in output terminal blocks that are adjacent to one another in the axial direction of the rotor via three-phase-circuit output bolts, and are electrically connected with three harnesses (wiring lines for connection) pulled out from the external driving circuit, etc. in the respective harness slots.

In the above-described conventional electric motor, the three-phase-circuit lead wires serving as the busbars connected to the coils that constitute the phases are connected with the harness slots provided in the output terminal blocks, via the internal terminals and three-phase circuit output bolts that are separate connecting members other than the three-phase circuit lead wires.

For this reason, in addition to the three-phase circuit lead lines (busbars), the internal terminals and the three-phase-circuit output bolts are needed for connection from the coils to the external driving circuit. Thereby, a connection system from a coil that constitutes each phase to an external driving circuit in an electric motor becomes complicated, and the number of parts increases. Further, lightness and compactness of the electric motor will be hindered due to the output terminal blocks having the harness slots, and the space occupied by the output terminal blocks.

SUMMARY OF THE INVENTION

The invention has been made to solve the above problem, and the object thereof is to provide an electric motor in which a connection system from coils that constitute each phase to an external driving circuit is simplified, the number of parts is reduced, and lightness and compactness are realized.

In order to solve the above-mentioned problem, an electric motor according to a first aspect of the invention includes:
a stator core;
coils of a plurality of phases, which are wound around the stator core and rotates a rotor by an electromagnetic force;
an insulator that insulates the coils and the stator core; and
a plurality of busbars that are fixed to the insulator, and relay feed of power to the coils,
wherein the busbars are integrally formed with driving circuit connecting terminals, respectively, the driving circuit connecting terminals being directly connected to an external driving circuit for controlling a driving current leading to each phase of the coils, without via separate connecting members.

According to this configuration, the function of the driving circuit connecting terminals directly connected to an external driving circuit for controlling a driving current leading to each phase of the coils without via separate connecting members is integrally given to the plurality of busbars that relay feed of power to the coils constituting each phase. For this reason, various connecting members and output terminal blocks, which have conventionally been needed for connection between the external driving circuit and the coils, become unnecessary. As a result, a connection system from the coils that constitutes each phase to the external driving circuit is simplified.

According to a second aspect of the invention, the driving circuit connecting terminals are formed in the shape of a flat plate so as to be brought into surface contact with a surface of a driving circuit board in which the driving circuit is formed, and be electrically connected with the driving circuit.

According to this configuration, since the driving circuit connecting terminals of the busbars are formed in the shape of a flat plate so as to be electrically connected with driving circuit on the board in a state where they are brought into surface contact with the surface of the driving circuit board, the electric contact between the driving circuit connecting terminals and the external driving circuit becomes positive.

According to a third aspect of the invention, the driving circuit board is disposed at an end of the insulator so that the surface of the driving circuit board is vertical to the axial directions of the rotor and the stator core.

According to this configuration, since the driving circuit connecting terminals of the busbars are formed in the shape of a flat plate so as to be brought into surface contact with the surface of the driving circuit board, and be electrically connected with the driving circuit, and the driving circuit board is disposed at an end of the insulator so that the surface thereof may be vertical to the axial direction of the rotor and the stator core. For this reason, a space that is occupied by the driving circuit connecting terminals and the driving circuit board in the axial direction of the rotor and the stator core can be made thin, and axial compactness (shortening of the total length) of the whole electric motor including the driving circuit board is achieved.

According to a fourth aspect of the invention, each of the busbars is fixedly buried in the insulator so that the surfaces of the driving circuit connecting terminals that come into surface contact with the driving circuit board are exposed.

According to this configuration, since each of the busbars is fixedly buried in the insulator so that the surface of each of the driving circuit connecting terminals that come into surface contact with the driving circuit board may be exposed, portions of the driving circuit connecting terminals protruding from the insulator are eliminated. As a result, the axial compactness (shortening of the total length) of the whole electric motor including the driving circuit board are further enhanced.

According to a fifth aspect of the invention, the driving circuit connecting terminal is provided with a through hole through which a bolt inserted through the driving circuit board passes, and
a nut to which the bolts are screwed are buried in the insulator so that a threaded hole of the nut communicates with the through hole of the driving circuit connecting terminal.

According to this configuration, the driving circuit connecting terminals are respectively provided with through holes through which bolts inserted through the driving circuit board pass, and nuts to which the bolts are screwed, respectively, are buried in the insulator so that threaded holes thereof may be made to communicate with the through holes of the driving circuit connecting terminals. For this reason, only by inserting the bolts through the driving circuit board, and screwing them to the nuts, the driving circuit board can be simply fixed to the insulator while the busbars and the driving circuit are connected electrically.

An electric pump unit according to a sixth aspect of the invention includes:

a pump portion that sucks and discharges fluid; and the electric motor according to the first aspect of the invention for driving the pump portion.

According to the invention, it is possible to obtain an electric motor in which a connection system from coils that constitute each phase to an external driving circuit is simplified, the number of parts is reduced, and lightness and compactness are realized.

BRIEF DESCRIPTION OF THE DRAWINGS

FIG. 1A is an axial sectional view showing principal parts of an electric pump unit according to an embodiment of the invention, and FIG. 1B is an end view of an insulator portion (including a stator core, coils, and busbars) according to this embodiment.

DETAILED DESCRIPTION OF PREFERRED EMBODIMENTS

Figure 2:
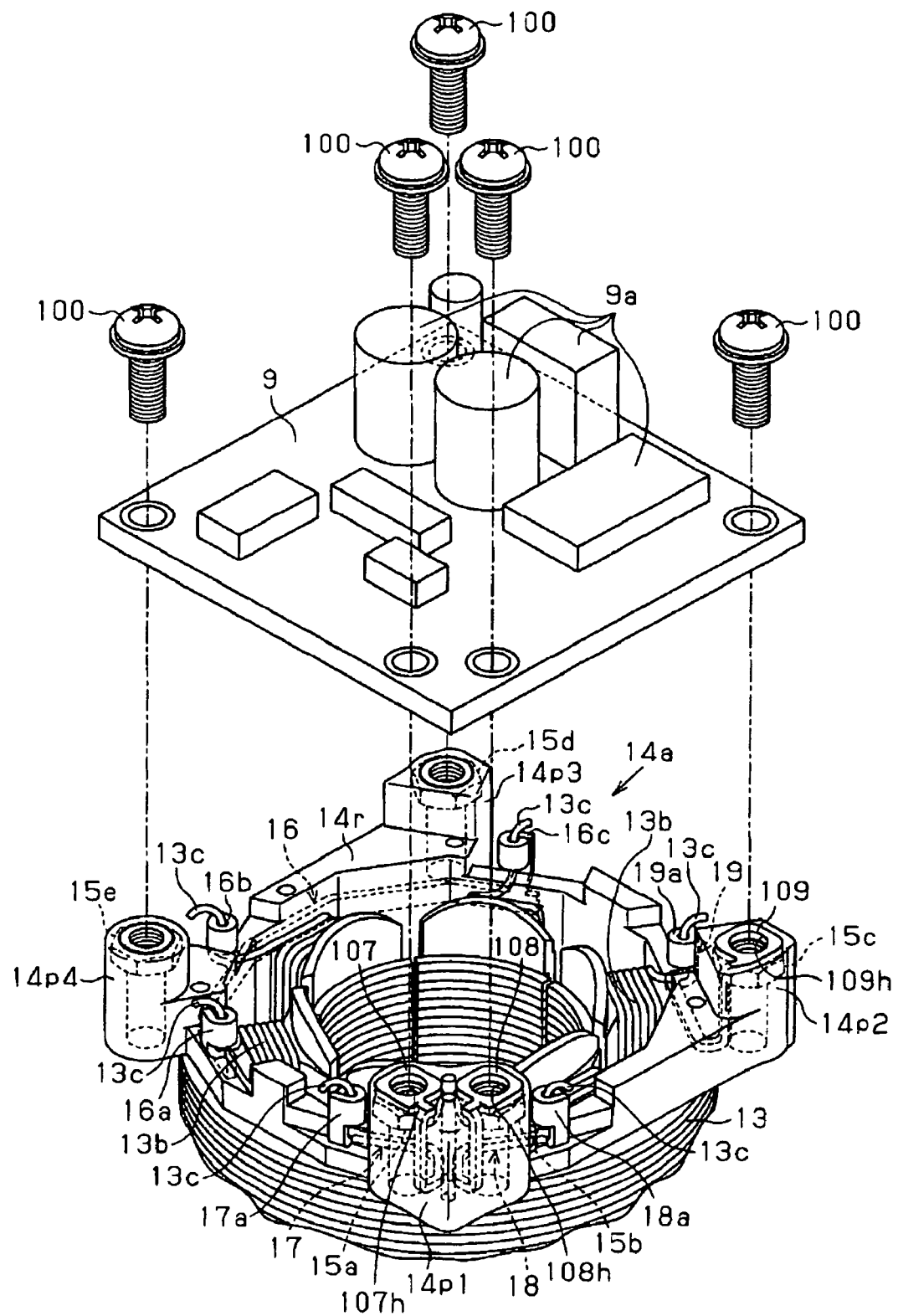
FIG. 2 is a perspective view showing that a driving circuit board according to the embodiment of the invention is attached to the insulator portion.

Hereinafter, embodiments of the invention will be explained according to the drawings. As shown in FIGS. 1A and 1B, an electric motor 1 of the embodiment is used for an electric pump unit 50 used as a hydraulic pump for a transmission of an automobile.

The electric motor 1 includes a rotor 12, a stator core 13 that surrounds the stator 12, and coils 13b that are wound around six (a plurality of) teeth 13a of the stator core 13. Moreover, the electric motor 1 includes a pair of tubular insulators 14a and 14b that are fitted from axial opposite ends of the stator core 13 so as to insulate each coil 13b and the stator core 13 (teeth 13a), and is accommodated in a bottomed quadrangular tubular motor case 11. In addition, referring to FIG. 1B, the electric motor 1 constitutes a three-phase brushless motor, and three pairs of facing coils 13b constitute a U phase, a V phase, and a W phase, respectively. Further, in this embodiment, the insulators 14a and 14b are formed by injection molding using PPS (polyphenylene sulfide) resin (insulator).

Referring to FIG. 1A, the electric pump unit 50 includes a pump portion 2 that sucks and discharges fluid, and the pump portion 2 and the electric motor 1 are unitized. Specifically, the pump portion 2 constitutes a so-called trochoid pump, and has an outer rotor 21, and an inner rotor 22 that is made rotatable so as to be circumscribed to the outer rotor 21. Moreover, the pump portion 2 is formed in a bottomed quadrangular tubular shape, and is accommodated in a pump chamber 24 that is a columnar cavity that is formed by a pump case 20 that is fixed to the motor case 11 so as to communicate therewith, and a pump plate 23 that plugs up an opening end of the pump case 20.

Further, the rotor 12 has a tubular magnet 12a born at a large diameter portion, and is rotatably supported by the pump case 20 and the motor case 11, via a first rolling bearing 4 provided in a central portion of a bottom 20a of the pump case 20, and a second rolling bearing 5 provided in a central portion of a bottom 11a of the motor case 11.

Also, the inner rotor 22 is journalled to the end of the rotor 12 on the side of the pump portion 2, is adapted to rotate as a driving current flows to each of the U, V, and W phases of the coils 13b, and the rotor 12 is rotated by an electromagnetic force generated in the stator core 13, and is adapted to be rotationally driven by the electric motor 1.

In the electric pump unit 50 of this embodiment, referring to FIG. 1A, a driving circuit board 9 in which a driving circuit for controlling the driving current is formed is disposed at an outside end face 11c of the motor case 11 so that the surface thereof may be vertical to the axial direction of the rotor 12 and the stator core 13. Also, the driving circuit board 9 is accommodated in a controller accommodation portion 9b along with electronic components 9a, such as ICs or capacitors on the board 9. Here, on the surface of the driving circuit board 9, a driving circuit is formed, and printed wiring (not shown) for mutually connecting the electronic components 9a is printed in a predetermined pattern.

As shown in FIGS. 1B and 2, five (a plurality of) nuts 15a, 15b, 15c, 15d, and 15e are buried in the insulator 14a (insulator on the side of the driving circuit board 9). Moreover, busbars 16 that mutually and electrically connect the three pairs of coils 13b that constitute the U, V, and W phases, respectively, and three (a plurality of) busbars 17, 18, and 19 that relay feed of power to the coils 13b, respectively, are buried in (fixed to) the insulator 14a by insert molding. Here, each of the busbars 16 to 19 is formed in a predetermined shape by bending a long metal plate material (plate material obtained by plating copper with tin) by press working or the like from a flat plate state.

Also, as shown in FIG. 2, five (a plurality of) bolts 100 are inserted through the driving circuit board 9, and are screwed to the nuts 15a to 15e, respectively. Thereby, the driving circuit board 9 is disposed at the end of the insulator 14a, and the busbars 17 to 19 and the driving circuit on the driving circuit board 9 are connected electrically.

Specifically, four (a plurality of) protruding portions 14p1 to 14p4 protrude from an annular portion 14r of the insulator 14a so as to abut on the surface of the driving circuit board 9. Also, nuts 15c to 15e are respectively buried in the protruding portions 14p2 to 14p4 by insert molding, and two nuts 15a and 15b are buried in the protruding portion 14p1 by insert molding (refer to FIG. 4A).

Figure 3:
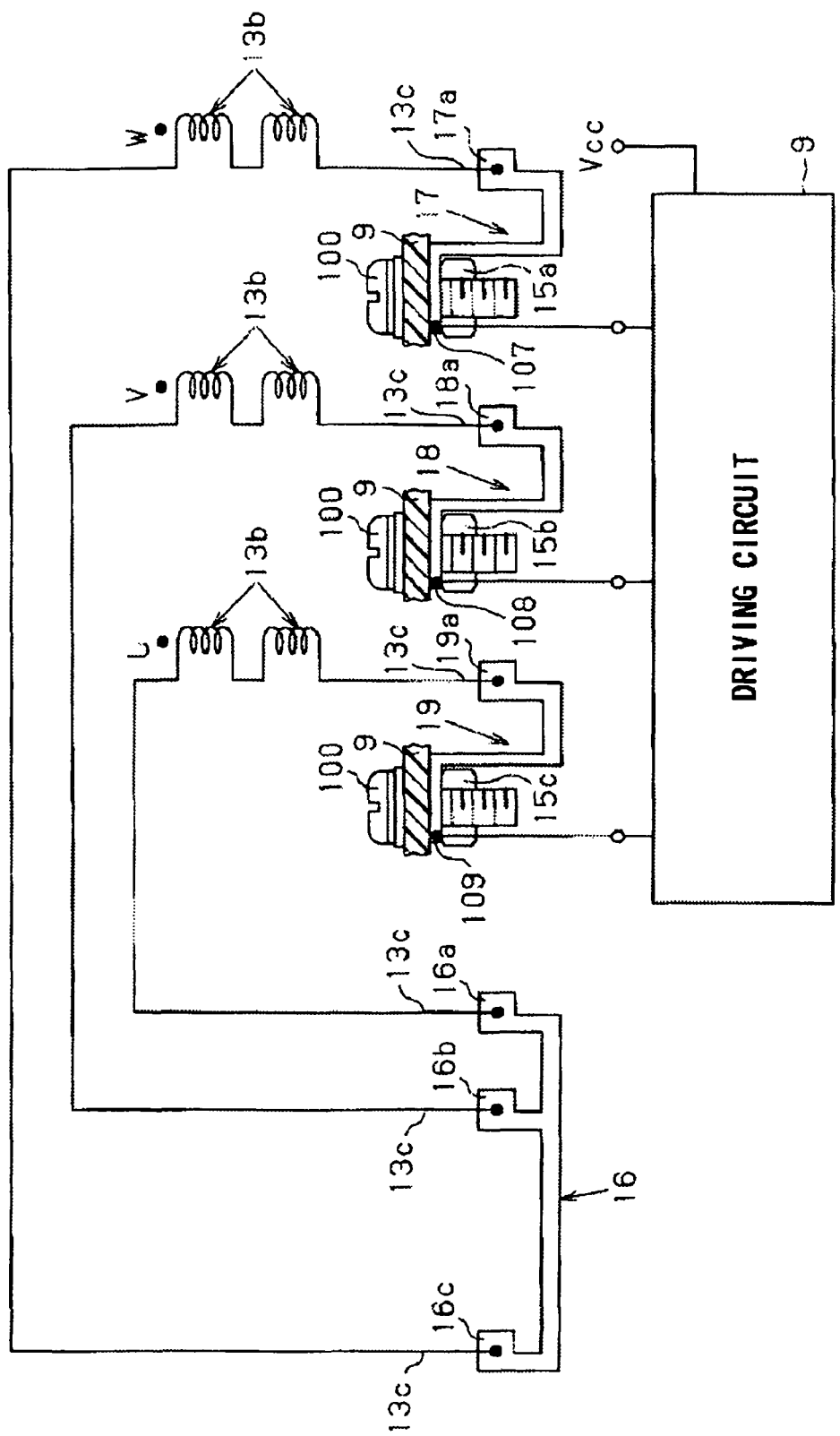
FIG. 3 is a wiring diagram showing a wiring system of the coils according to the embodiment of the invention.

Further, as shown FIGS. 1B, 2, and 3, the busbar 16 functions as a common electrode (COM electrode) of the U, V, and W phases that are formed by the coils 13b, and is formed in an arcuate shape and with a greatest length). Three busbar terminals 16a, 16b, and 16c, each of which has a slit-like portion whose one end is open, are formed integrally in the busbar 16. Also, each of the busbar terminals 16a to 16c is connected to one end 13c of a pair of the coils 13b that constitute each of the U, V, and W phases. Specifically, one end 13c of each of the coils 13b is engaged with the slit-like portion of each of the busbar terminals 16a to 16c, and the engaged portion is resistance-welded by fusing.

On the other hand, the busbars 17 to 19 function as feed electrodes that feed the driving current from the driving circuit board 9 to the coils 13b, and busbar terminals 17a, 18a, and 19a, each of which is formed in the same shape as the busbar terminals 16a to 16c, and has a slit-like portion whose one end is open, are formed integrally in the busbars 17 to 19, respectively. Also, each of the busbar terminals 17a to 19a is connected to one end 13c of the pair of coils 13b. Specifically, one end 13c of each of the coils 13b is engaged with the slit-like portion of each of the busbar terminals 17a to 19a, and the engaged portion is resistance-welded by fusing.

Referring to FIG. 2, flat-plate-like ring-shaped terminals (driving circuit connecting terminals) 107, 108, and 109 that have through holes 107h, 108h, and 109h that are circular in plan view and through which bolts 100 inserted through the driving circuit board 9 are inserted are formed integrally in the busbars 17 to 19, respectively. Moreover, each of the busbars 17 to 19 is fixedly buried in the insulator 14a with the surface of each of the ring-shaped terminals 107 to 109 exposed from the insulator 14a.

Figure 4A:
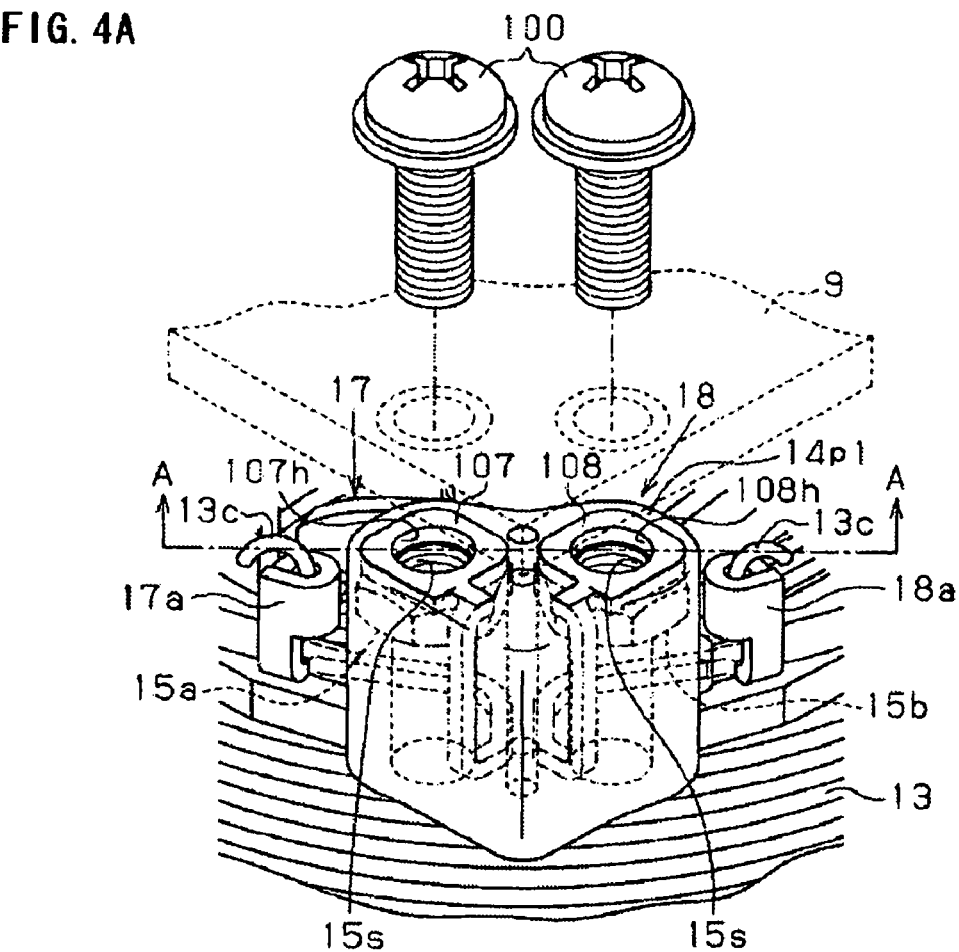
FIG. 4A is an enlarged view of the principal parts of FIG. 2.

Also, as shown in FIG. 4A, the nuts 15a and 15b to which the bolts 100 and 100 are screwed, respectively, are buried in the protruding portion 14p1 so that threaded holes 15s and 15s thereof may be made to communicate with the through holes 107h and 108h of the ring-shaped terminals 107 and 108. Also, each of the bolts 100 is inserted through the driving circuit board 9, and is screwed to each of the nuts 15a and 15b. Although illustration is omitted, the nut 15c to which the bolt 100 is screwed is also buried in the protruding portion 14p2 so that the threaded hole 15s thereof may be made to communicate with the through hole 109h of the ring-shaped terminal 109.

Figure 4B:
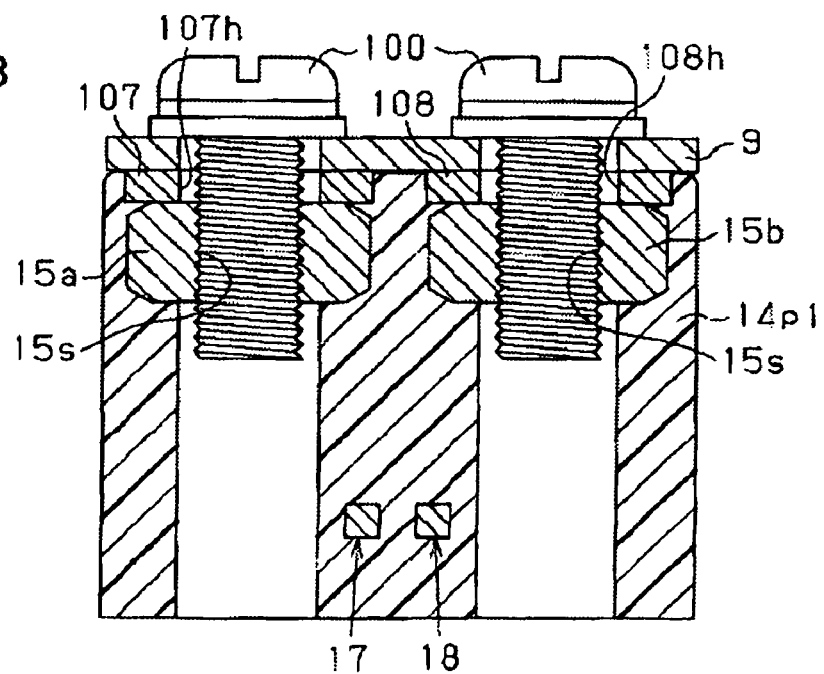
FIG. 4B is a sectional view taken along A-A of FIG. 4A.

Thereby, as shown in FIG. 4B, by the three bolts 100, the driving circuit board 9, the ring-shaped terminals 107 to 109, and the nuts 15a to 15c are fixed in surface contact with one another, and the three pairs of coils 13b that constitute the U, V, and W phases, respectively, and the driving circuit on the driving circuit board 9 are connected electrically.

In this embodiment, as described above, the busbars 17 to 19 are directly connected with the driving circuit board 9 via the ring-shaped terminals 107 to 109, without via metallic connecting members or output terminal blocks other than the busbars 17 to 19. Also, a driving current controlled by the driving circuit included in the driving circuit board 9 is supplied to each of the coils 13b via each of the busbars 17 to 19.

The electric motor 1 of this embodiment is configured as described above, and exhibits the following operation and effects.

(1) In order to relay feed of power to a pair of coils 13b that constitute each of U, V, and W phases, the function of the ring-shaped terminals (driving circuit connecting terminals) 107 to 109 directly connected to an external driving circuit (driving circuit on the driving circuit board 9) for controlling a driving current leading to each of the U, V, and W phases of the coils 13b without via separate connecting members is integrally given to the plurality of busbars 17 to 19 electrically connected to the coils 13b. For this reason, various connecting members and output terminal blocks, which have conventionally been needed for connection between the external driving circuit and the coils 13b, in addition to the busbars 17 to 19, become unnecessary. As a result, a connection system from the coils 13b that constitutes each phase to the external driving circuit is simplified.

(2) Since the ring-shaped terminals 107 to 109 of the busbars 17 to 19 are formed in the shape of a flat plate so as to be brought into surface contact with the surface of the driving circuit board 9, and be electrically connected with printed wiring (driving circuit) on the board 9, the electric contact between the ring-shaped terminals 107 to 109 and the external driving circuit becomes positive.

(3) Since the ring-shaped terminals 107 to 109 of the busbars 17 to 19 are formed in the shape of a flat plate so as to be brought into surface contact with the surface of the driving circuit board 9, and be electrically connected with the driving circuit on the board 9, and the driving circuit board 9 is disposed at an end of the insulator 14a so that the surface thereof may be vertical to the axial direction of the rotor 12 and the stator core 13 of the electric motor 1. For this reason, a space that is occupied by the ring-shaped terminals 107 to 109 and the driving circuit board 9 in the axial direction of the rotor 12 and the stator core 13 can be made thin, and axial compactness (shortening of the total length) of the whole electric motor 1 including the driving circuit board 9 is achieved.

(4) Each of the busbars 17 to 19 is fixedly buried in the insulator 14a so that the surface of each of the ring-shaped terminals 107 to 109 that come into surface contact with (printed wiring of) the driving circuit board 9 may be exposed. For this reason, portions of the ring-shaped terminals 107 to 109 protruding from the insulator 14a are eliminated. As a result, the axial compactness (shortening of the total length) of the whole electric motor 1 including the driving circuit board 9 are further enhanced.

(5) The ring-shaped terminals 107 to 109 of the busbars 17 to 19 are respectively provided with the through holes 107h to 109h through which the bolts 100 inserted through the driving circuit board 9 passes. Further, the nuts 15a to 15c to which the bolts 100 are screwed, respectively, are buried in the insulator 14a so that the threaded holes 15s thereof may be made to communicate with the through holes 107h to 109h of the ring-shaped terminals 107 to 109. For this reason, only by inserting the bolts 100 through the driving circuit board 9, and screwing them to the nuts 15a to 15c, the driving circuit board 9 can be simply fixed to the insulator 14a while the busbars 17 to 19 and the driving circuit on the board 9 are connected electrically.

In addition, the above-mentioned embodiment may be modified as follows.

In the above embodiment, the electric motor 1 including the busbars 17 to 19 is used for the electric pump unit 50 used as an hydraulic pump for a transmission of an automobile. However, the electric motor 1 is not limited thereto, and may be used for power steering of an automobile, and may be used for other general applications.

In the above embodiment, the flat-plate-shaped terminals 107 to 109 serving as driving circuit connecting terminals are formed in the shape of a ring so as to have the through holes 107h, 108h, and 109h that are circular in plan view, However, the terminals are not limited thereto, and may be formed substantially in a C-shape, for example, the letter C in plan view so that the bolts 100 may be fixedly fitted at the side portion thereof.

In the above embodiment, each of the busbars 17 to 19 is fixedly buried in the insulator 14a so that the surface of each of the ring-shaped terminals 107 to 109 may be exposed. The busbars are not limited thereto, and may be fixedly buried in the insulator 14a so that the ring-shaped terminals 107 to 109 may protrude from the insulator 14a.

In the above embodiment, the inner-rotor-type electric motor 1 in which the rotor 12 is arranged inside the stator core 13 has been described. However, the invention is not limited thereto, and the technical idea of the invention can be similarly applied to an outer-rotor-type electric motor in which the rotor 12 is arranged outside the stator core 13.

What is claimed is:
1. An electric motor comprising:
a stator core;
a plurality of coils of a plurality of phases, which are wound around the stator core and rotate a rotor by an electromagnetic force;

an insulator that insulates the coils and the stator core;

a plurality of busbars that are fixedly buried in the insulator, and relay a feed of power to the coils; and a plurality of driving circuit connecting terminals, integrally formed with the busbars, respectively, the driving circuit connecting terminals including surfaces that are exposed from the insulator and being directly connected to an external driving circuit for controlling a driving current leading to each phase of the coils, without connecting through a separate connecting member, such that the surfaces of the driving circuit connecting terminals that are exposed from the insulator abut against a surface of the external driving circuit which faces the plurality of coils, wherein the driving circuit connecting terminals comprise a flat plate shape so as to extend in parallel with the surface of an external driving circuit board which faces the plurality of coils, and wherein a plurality of nuts buried in the insulator and a plurality of bolts inserted through the driving circuit board are screwed together respectively, such that the driving circuit board is disposed at an end of the insulator and the busbars and the driving circuit on the driving circuit board are connected electrically.

2. The electric motor according to claim 1, wherein the driving circuit board is disposed at an end of the insulator such that the surface of the driving circuit board is perpendicular to an axial direction of the rotor and the stator core.

3. The electric motor according to claim 1, wherein the driving circuit connecting terminal is provided with a through hole through which a bolt of the plurality of bolts inserted through the driving circuit board passes, and wherein a nut of the plurality of nuts to which the bolt is screwed is buried in the insulator such that a threaded hole of the nut communicates with the through hole of the driving circuit connecting terminal.

4. An electric pump unit comprising:

a pump portion that sucks and discharges fluid; and the electric motor according to claim 1 for driving the pump portion.

5. The electric motor according to claim 1, wherein the insulator is at least partially disposed between the coils.

6. The electric motor according to claim 1, wherein the plurality of busbars are fixedly attached to a subset of the coils.

7. The electric motor according to claim 1, wherein the insulator is fixed to the stator and the coils.

8. The electric motor according to claim 1, wherein the external driving circuit is detachably connected to the driving circuit connecting terminals.

9. The electric motor according to claim 1, wherein the busbars connect through the driving circuit connecting terminals to the external driving circuit.

10. The electric motor according to claim 1, wherein the busbars extend outwardly in an axial direction from the stator, and the driving circuit connecting terminals are formed respectively on a plurality of distal ends of the busbars.

11. The electric motor according to claim 1, wherein the insulator is fixed to the stator.

12. The electric motor according to claim 1, wherein the driving circuit board is not embedded in the insulator.

13. The electric motor according to claim 1, wherein a surface of a busbar of the busbars contacts a surface of the external driving circuit.

14. The electric motor according to claim 1, wherein a driving circuit connecting terminal of the plurality of driving circuit connecting terminals comprises a flat surface of a busbar, and wherein the flat surface of the busbar contacts a surface of the external driving circuit.

15. An electric motor comprising:

a stator core;

a plurality of coils of a plurality of phases, which are wound around the stator core and rotate a rotor by an electromagnetic force;

an insulator fixed to the coils and the stator core;

a plurality of busbars that are fixedly buried in the insulator, and relay power to the coils; and a plurality of driving circuit connecting terminals integrally formed and directly connected to the plurality of busbars, respectively, the driving circuit connecting terminals including surfaces that are exposed from the insulator, wherein the driving circuit connecting terminals are directly connected to an external driving circuit for controlling a driving current leading to each phase of the coils, such that the surfaces of the driving circuit connecting terminals that are exposed from the insulator abut against a surface of the external driving circuit which faces the plurality of coils, wherein the driving circuit connecting terminals comprise a flat plate shape so as to extend in parallel with the surface of an external driving circuit board which faces the plurality of coils, and wherein a plurality of nuts buried in the insulator and a plurality of bolts inserted through the driving circuit board are screwed together respectively, such that the driving circuit board is disposed at an end of the insulator and the busbars and the driving circuit on the driving circuit board are connected electrically.

16. The electric motor according to claim 15, wherein the external driving circuit is detachably connected to the driving circuit connecting terminals.

17. The electric motor according to claim 15, wherein the busbars extend outwardly, in an axial direction from the stator, and the driving circuit connecting terminals are formed respectively on a plurality of distal ends of the busbars.

* * * * *